United States Patent [19]

Shiba et al.

[11] Patent Number: 4,707,757
[45] Date of Patent: Nov. 17, 1987

[54] PRESSING SPRING FOR A MAGNETIC TAPE CARTRIDGE

[75] Inventors: Haruo Shiba; Yoshiya Sakata, both of Saku, Japan

[73] Assignee: TDK Corporation, Tokyo, Japan

[21] Appl. No.: 644,256

[22] Filed: Aug. 27, 1984

[30] Foreign Application Priority Data

Sep. 9, 1983 [JP] Japan .................... 58-139112[U]

[51] Int. Cl.⁴ .................. G11B 23/02; G11B 15/32; G01B 1/04
[52] U.S. Cl. ................... 360/132; 360/137; 242/199
[58] Field of Search .............. 360/132, 96.5, 96.6, 360/137, 93, 130.3, 130.33, 105; 242/191-200

[56] References Cited

U.S. PATENT DOCUMENTS

| | | | |
|---|---|---|---|
| 3,900,171 | 8/1975 | Serizawa | 360/132 |
| 3,934,839 | 1/1976 | Serizawa | 242/198 |
| 4,058,844 | 11/1977 | Dirks | 360/105 |
| 4,309,002 | 1/1982 | Saitou et al. | 242/198 |
| 4,484,248 | 11/1984 | Ogiro et al. | 360/132 |
| 4,544,062 | 10/1985 | Maehara | 242/197 |
| 4,561,609 | 12/1985 | Collins et al. | 242/199 |

FOREIGN PATENT DOCUMENTS

| | | | |
|---|---|---|---|
| 0045082 | 2/1982 | European Pat. Off. | 360/132 |
| 1393476 | 5/1975 | United Kingdom | 360/132 |
| 1416588 | 12/1975 | United Kingdom | 360/132 |
| 1441619 | 7/1976 | United Kingdom | 360/132 |
| 1525935 | 9/1978 | United Kingdom | 360/132 |
| 1552251 | 9/1979 | United Kingdom | 360/132 |
| 2099399 | 12/1982 | United Kingdom | 360/132 |

*Primary Examiner*—John H. Wolff
*Assistant Examiner*—Alfonso Garcia
*Attorney, Agent, or Firm*—Oblon, Fisher, Spivak, McClelland & Maier

[57] ABSTRACT

A magnetic tape cartridge is provided with a pressing spring secured to a cartridge to press a spring-contact projection formed at the center of the upper part of a reel. The pressing spring includes a reel-contacting part formed at its inner part, a spring-functioning part holding the reel-contacting part and a base plate connected to a root portion of the spring-functioning part. The reel-contacting part presses the spring-contact projection of the reel downwardly so that a pressing force acts on the reel in its axial direction.

5 Claims, 5 Drawing Figures

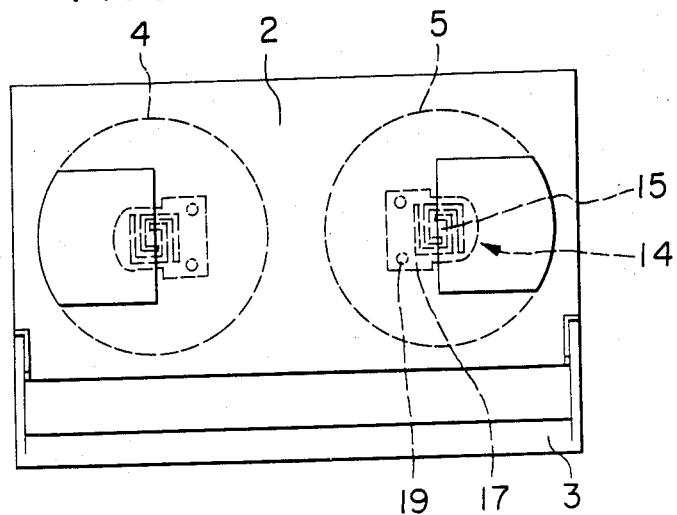
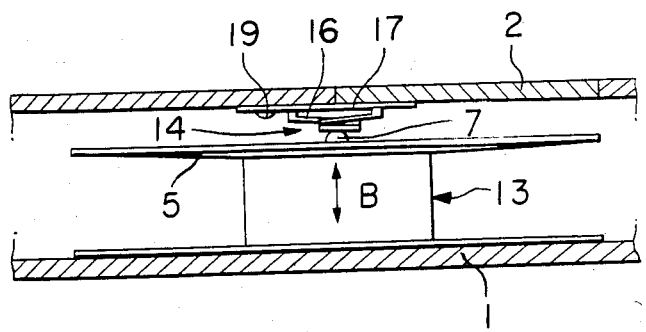
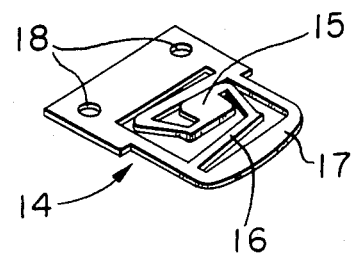

PRESSING SPRING FOR A MAGNETIC TAPE CARTRIDGE

BACKGROUND OF THE INVENTION

1. Field of the Invention

The present invention related to a magnetic tape cartridge. More particularly, it relates to an improvement in a spring for pushing the top end of a reel shaft of a magnetic tape cartridge.

2. Related Art

A video tape cartridge is generally constructed in such a manner that a pair of circular openings are formed in a bottom plate of a lower half casing which is to be coupled to an upper half casing; a pair of reels around of which video tapes are wound are loosely fitted to the openings and a pressing spring is secured to the inner surface of a top plate in the upper casing so as to press the top end of a projection at the center of the reel by the extreme end of the spring. When the upper and lower casings are coupled together, a front cover 3 is attached in the front of the coupled casings so as to be capable of opening and closing; a pair of reels 4, 5 is put inside the casings in a freely rotatable manner and each of projections 6, 7 provided at the center of reels is pressed by each of the extreme end of a leaf spring 8 as shown in FIGS. 1 and 2. Thus, the conventional VHS type video tape cartridge has been assembled. The leaf spring 8 of the conventional video tape cartridge is, however, so fabricated that it is firmly attached to the inner surface of the top plate in the upper half casing by melt-bonding boss 11 at its central portion and the leaf spring end are greatly curved toward their extreme ends so as to have a sufficient flexibility thereby allowing vertical movement of the reels when the cartridge is placed on a video tape recorder. Accordingly, the direction of a force for pressing the projections 6, 7 of the reels 4, 5 assumes the direction as shown by the arrow mark A which is perpendicular to a plane of the extreme end 9, or 10.

There is a fairly large amount of clearance between each of the inner walls 13 of the winding cores and each of shafts 12 of the video tape recorder inserted into the winding core when a video tape cartridge is mounted on the video tape recorder, on account of which the axial line of each of the tape recorder shafts 12 is not in coincidence with that of each of the reels under condition that the projection 7 of the reel is always pushed inwardly whereby both the axial lines are always deflected toward each other during operations of the video tape recorder. If a magnetic tape wound on the winding core 13 of the reel is drawn out under the condition as described above, a irregular movement of the reel takes place around the shaft of the video tape recorder whereby there occurs a jittering phenomenon due to variations in tensile force in the magnetic tape.

SUMMARY OF THE INVENTION

It is an object of the present invention to eliminate the disadvantage of the conventional video tape cartridge and to provide an improved video tape cartridge capable of elimination of variations in tensile strength and jittering of the magnetic tape caused by irregular revolution of a reel by providing a spring to press the reel in the direction parallel to the axial line.

The foregoing and the other objects of the present invention have been attained by providing a magnetic tape cartridge provided with a pressing spring secured to a cartridge to press a spring-contact projection formed at the center of the upper part of a reel, characterized in that the pressing spring comprises a reel-contacting part formed at its inner part, a spring-functioning part holding the reel-contacting part and a base plate connected to a root portion of the spring-functioning part, the reel-contacting part pressing the spring-contact projection of the reel downwardly so that a pressing force acts on the reel in its axial direction.

BRIEF DESCRIPTION OF THE DRAWINGS

The foregoing objects, other objects as well as specific construction and improved magnetic tape cartridge will be become apparent and understandable from the following detailed description thereof, when read in conjunction with the accompanying drawing.

In the drawing:

FIG. 3 is a front view of an embodiment of the magnetic tape cartridge according to the present invention;

FIG. 4 is an enlarged elevation view partly cross-sectioned of the magnetic tape cartridge shown in FIG. 3;

FIG. 5 is a perspective view of a pressing spring used for the magnetic tape cartridge of the present invention.

DETAILED DESCRIPTION OF THE PREFERRED EMBODIMENTS

An embodiment of the present invention will be described with reference to the drawings.

Figure 1:
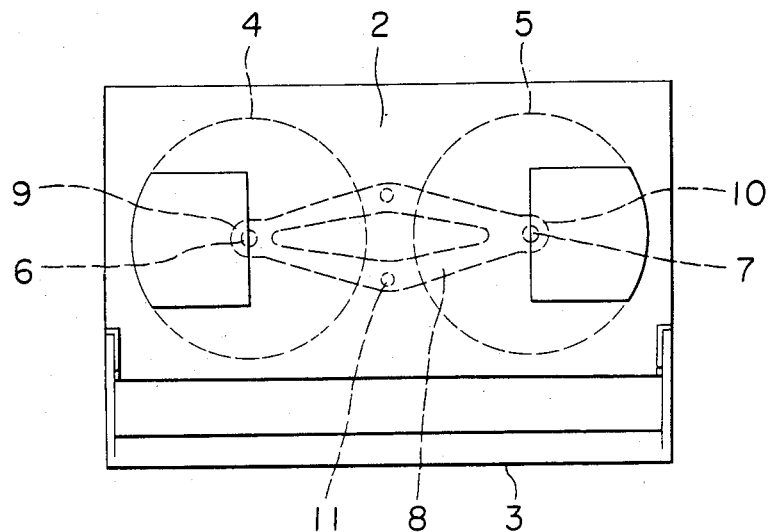
FIG. 1 is a front view of a conventional magnetic tape cartridge.
Figure 2:
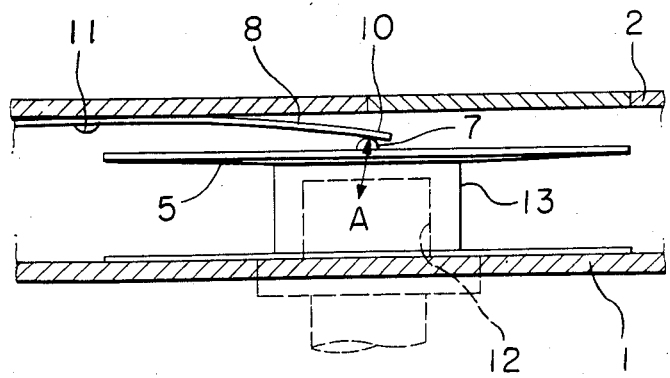
FIG. 2 is an enlarged elevation view partly cross-sectioned of a conventional magnetic tape cartridge.

FIGS. 3 and 4 show a video tape cartridge provided with a unique pressing spring according to the present invention, in which the same reference numerals as in FIGS. 1 and 2 designate the same or corresponding parts and therefore description concerning these parts is omitted. Since the video tape cartridge is symmetric with respect to the center line, only the right hand part will be described.

A pressing spring 14 is attached to the upper half casing 2 with its functioning part being in coincidence with the top of the projection 7 provided at the top of the central axis of the reel 5 so as to press the projection 7 in its axial direction. As clearly shown in FIG. 5, the spring 14 is formed by punching or shaping a metallic sheet used for a spring, such as stainless steel, phosphor bronze etc. or highly elastic plastic sheet such as polyacetal etc. or molding resinous material having high elasticity. The spring 14 made of metallic material will be described. A single metallic sheet is punched to form a substantially rectangular configuration in which a reel-contacting part 15 is supported by a base plate 17 inside thereof through a spring-functioning part 16. The base plate is provided with at least one fitting hole 18 which may be formed at the time of punching of the reel-contacting part 15 and the spring-functioning part 16. In FIGS. 3 and 5, two fitting holes 18 are formed. The reel-contacting part has a flat surface and is horizontally supported by the spring-functioning part 16. The root portion of the spring-functioning part 16 is connected to the base plate 17. Preferably, the spring-functioning part 16 extends between the reel contacting part 15 and the base plate 17 in a symmetrical relationship with respect to the reel contacting part 15. Most preferably, the functioning part may be a pair of L-shaped arms. The reel-contacting part 15 is extended to the extent that a predetermined spring pressure is imparted to the reel. The adjusting operations of the reel-contacting part can be easily done since the spring-functioning part consists of a pair of symmetrical arms. The pressing spring 14 having been thus adjusted is firmly connected to a predetermined position on the inner surface of the upper half casing, namely a position that the central axial line of the reel is in alignment with the reel-contacting part 15. The connecting operation is carried out by inserting the fitting hole 18 formed in the base plate to a boss 19 and then melting the boss to connect them.

As apparent from FIG. 4, the reel-contacting part 15 having a flat surface and supported horizontally in the spring 14 is in contact with the projection 7 at the center of the reel 5 at the right angle so that it has a operating line in the direction shown by the arrow mark B. Accordingly, in the reel, there is no component of pressing force acting in the horizontal direction and the central axial line of the reel is precisely in alignment with the axial line of a shaft of a video tape recorder whereby variation in tensile force in a magnetic tape is suppressed by uniform revolution of the reel to thereby eliminate jittering phenomenon.

We claim:

1. In a magnetic tape cartridge having lower and upper half casings between which at least one reel is positioned for rotation, said reel having a projection at an axis of said rotation, a pressing spring for each said reel, each said pressing spring comprising:
   a reel contacting part engageable with said projection to provide a pressing force thereon;
   a base plate surrounding said reel contacting part and being fixed relative to one of said half casings; and
   a spring functioning part connecting said reel contacting part and said base plate, wherein said spring-functioning part is in a form of a plurality of arms connecting said reel-contacting part to said base plate, said arms being symmetrical about said reel-contacting part, wherein each of said arms is L-shaped and has one end connected to said reel contacting part and another end connected to said base plate;
   wherein said reel contacting part, said base plate and said spring functioning part are unitarily formed from flat elastic sheet material, and wherein said pressing spring is positioned within said cartridge such that said reel contacting part is on said axis and said pressing force acts parallel with said rotational axis, whereby jittering of said tape is reduced.

2. The magnetic tape cartridge according to claim 1, wherein said pressing spring is made of a material selected from a group consisting of metallic spring material such as stainless steel, phosphor bronze and a plastic spring material such as polyacetal.

3. The magnetic tape cartridge according to claim 1, wherein said base plate is constituted by a substantially rectangular sheet plate in which said reel-contacting part and said spring-functioning part are formed by punching operation.

4. The magnetic tape cartridge according to claim 3, wherein said base plate is provided with at least one fitting hole by which said pressing spring is attached to said upper half casing.

5. The magnetic tape cartridge according to claim 1, wherein said reel-contacting part extends transverse to said rotational axis.

* * * * *